UNITED STATES PATENT OFFICE.

ADOLF RÖMER, OF STUTTGART, GERMANY, ASSIGNOR TO ADOLF KUTTROFF, OF NEW YORK, N. Y.

MANUFACTURE OF SUBSTANCES PRECIPITATING GLUE.

1,375,976.   Specification of Letters Patent.   Patented Apr. 26, 1921.

No Drawing. Application filed May 9, 1917, Serial No. 167,561. Renewed June 29, 1920. Serial No. 392,772.

*To all whom it may concern:*

Be it known that I, ADOLF RÖMER, a citizen of the German Empire, residing at Stuttgart, Germany, have invented new and useful Improvements in the Manufacture of Substances Precipitating Glue, of which the following is a specification.

The present invention relates to a new composition of matter which is derived from naphthalene and which can serve as a synthetic tanning material. The application is a continuation in part of my co-pending application Serial No. 874,540 entitled: "Improvements in the manufacture of substances precipitating glue" and includes subject-matter erased without prejudice from said original application with the express intention of applying for a separate patent.

In my co-pending application Serial No. 874,540 I have described that I can obtain new condensation products by treating for instance a naphthol sulfonic acid with a small quantity of sulfuric acid, or with phosphorus oxychlorid at a moderate temperature. The new condensation products thus obtained are characterized by their property of strongly precipitating glue solutions.

Now I have discovered that I can obtain water-soluble products of anhydrous nature which equally can serve as valuable tanning materials by treating with sulfonating agents the naphthalene sulfones, which can be produced from naphthalene by treatment, under suitable conditions, with concentrated sulfuric acid and condensing the sulfonic acids of the sulfones with formaldehyde. New products having good tanning properties are thereby formed. The same products can be formed also in the fiber of the skin to be tanned, by treating the depilated skin with a solution of formaldehyde, before or after the treatment with the solution of the sulfonated naphthalene sulfone. By the term naphthalene sulfone I include the unsubstituted naphthalene sulfone, possessing the composition $C_{10}H_7-SO_2-C_{10}H_7$ itself as well as its derivatives. One such derivative can be produced by heating naphthalene with a naphthol sulfonic acid and this body is then transformed according to my present invention into a water-soluble derivative by treating with a sulfonating agent and then with formaldehyde.

The following are examples of how this invention can be performed but the invention is not limited to these examples. The parts are by weight.

*Example.*

3 parts of beta-dinaphthyl-sulfone are transformed into a sulfonic acid derivative by heating to about 200° C. with 3 parts of concentrated sulfuric acid. The reaction mass is cooled and mixed with 0.35 parts of 40% formaldehyde, stirred for some time and then partly neutralized with soda lye. The condensation product formed is easily soluble in water and can be employed in the ordinary manner as a tanning liquor.

What I claim as my invention and desire to secure by Letters Patent is:

The process of producing new water-soluble products which are capable of precipitating glue from its solutions, which comprises treating, with a sulfonating agent, a naphthalene sulfone and acting upon the product with formaldehyde.

In testimony whereof I have hereunto set my hand.

ADOLF RÖMER.